E. KNAUSS.
RIM CONTRACTOR.
APPLICATION FILED DEC. 4, 1915.

1,242,950.

Patented Oct. 16, 1917.
3 SHEETS—SHEET 1.

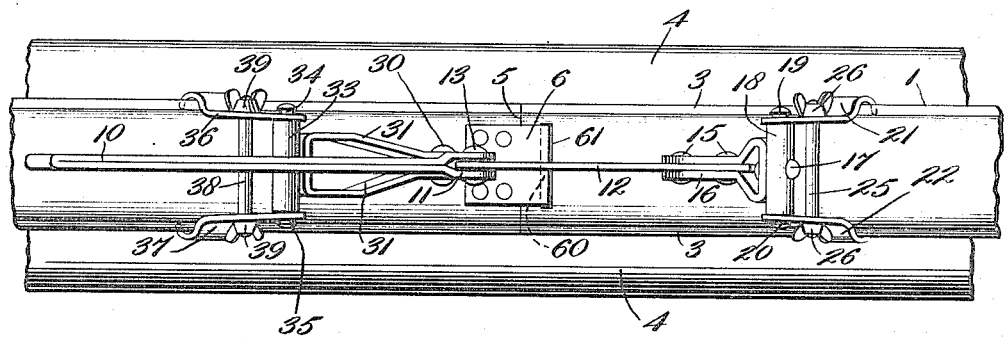
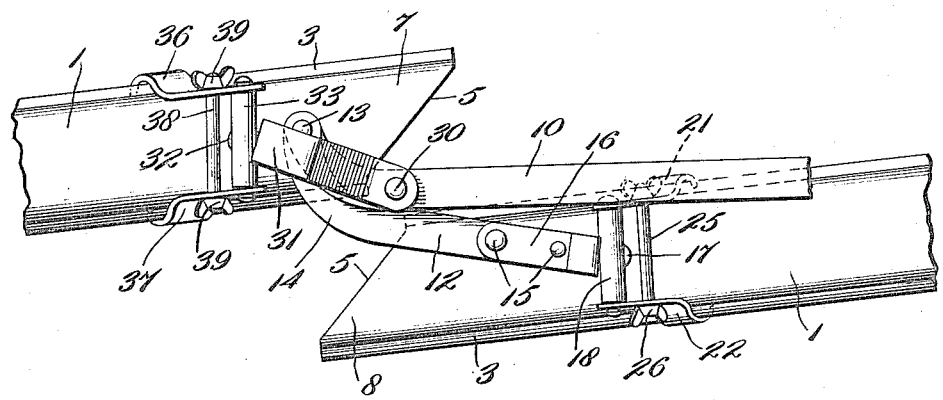
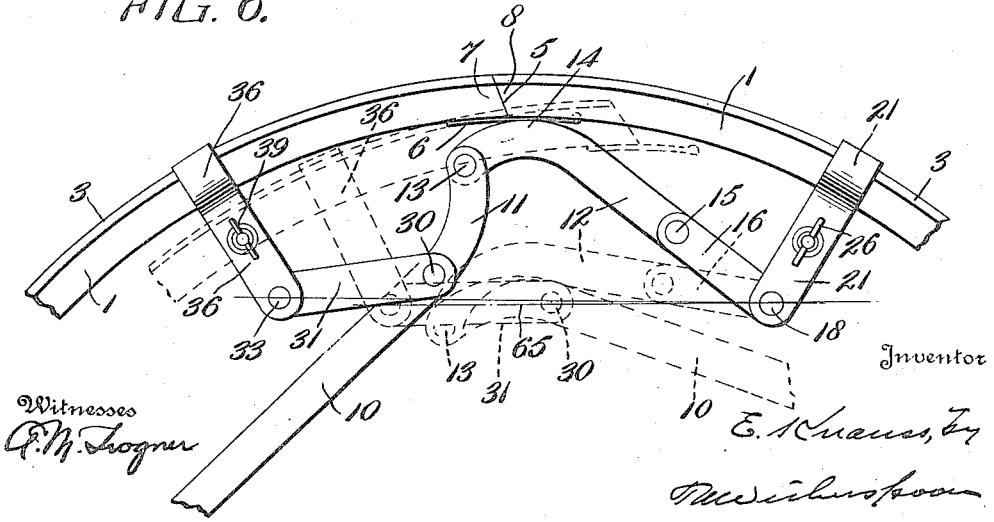

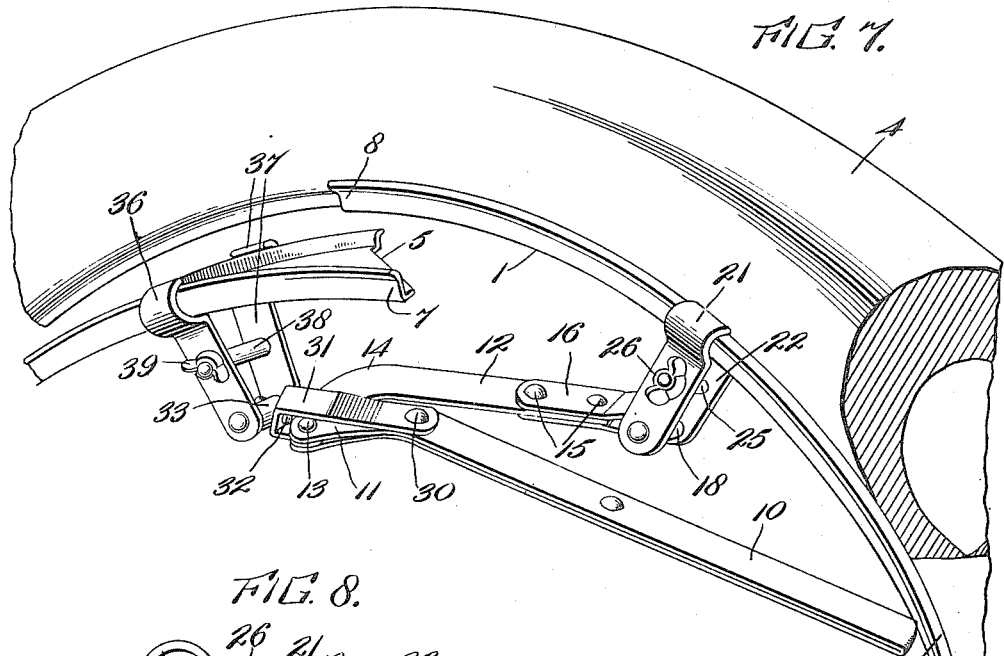
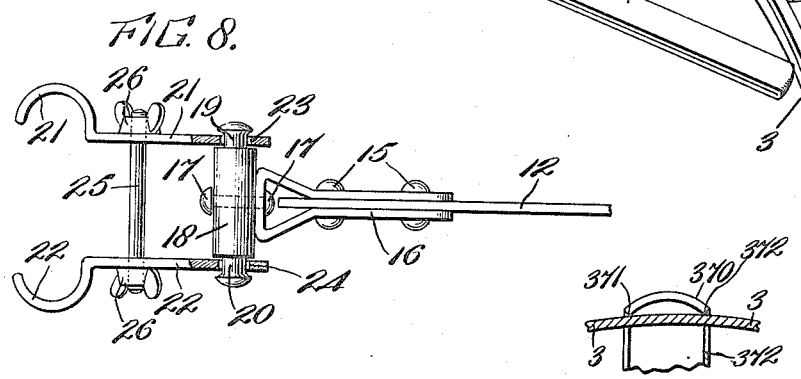
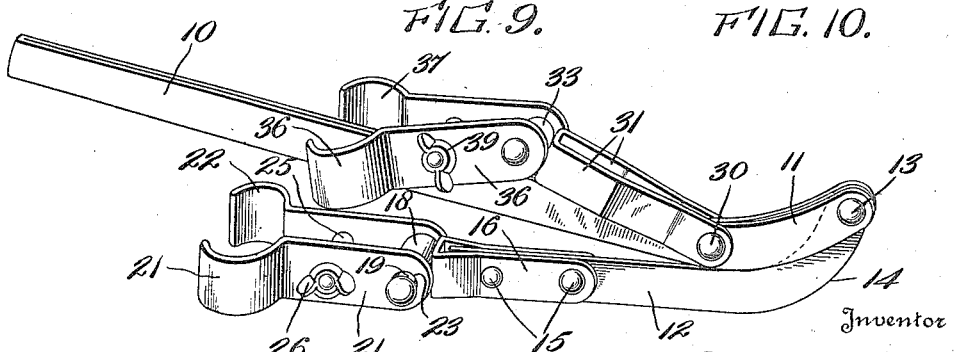

UNITED STATES PATENT OFFICE.

EDWARD KNAUSS, OF NEW YORK, N. Y., ASSIGNOR, BY DIRECT AND MESNE ASSIGNMENTS, TO THE K. P. MANUFACTURING COMPANY, INC., OF NEW YORK, N. Y., A CORPORATION OF NEW YORK.

RIM-CONTRACTOR.

1,242,950.      Specification of Letters Patent.      Patented Oct. 16, 1917.

Application filed December 4, 1915. Serial No. 65,069.

*To all whom it may concern:*

Be it known that I, EDWARD KNAUSS a citizen of the United States, residing at New York city, in the county of New York and State of New York, have invented certain new and useful Improvements in Rim-Contractors; and I do hereby declare the following to be a full, clear, and exact description of the invention, such as will enable others skilled in the art to which it appertains to make and use the same.

This invention relates to devices for contracting and expanding the tire carrying rims of vehicles, popularly known as demountable rims, and has for its object to provide a tool of this character which will be of simple and durable construction, comparatively inexpensive to manufacture and more efficient in action than those heretofore proposed.

With these and other objects in view the invention consists in the novel details of construction and combinations of parts, more fully hereinafter disclosed and particularly pointed out in the claims.

Referring to the accompanying drawings forming a part of this specification, in which like numerals designate like parts in all the views:—

Fig. 4 is a bottom plan view of the parts as seen in Fig. 1;

Fig. 5 is a view similar to Fig. 4 but showing the tool in use on a different type of rim, the parts being shown in the position they assume after the collapse of the rim;

Fig. 6 is a view similar to Fig. 1, illustrating in full and dotted lines the locking features of the device;

Fig. 7 is a perspective view of the parts as shown in Fig. 5;

Fig. 8 is a detail plan view, partly in section, of one of the clamps used and its associated parts;

Fig. 9 is a perspective view showing the tool folded into its most compact form, for transportation, and Fig. 10 is a detail view showing a slightly modified form of clamp.

Figure 1:
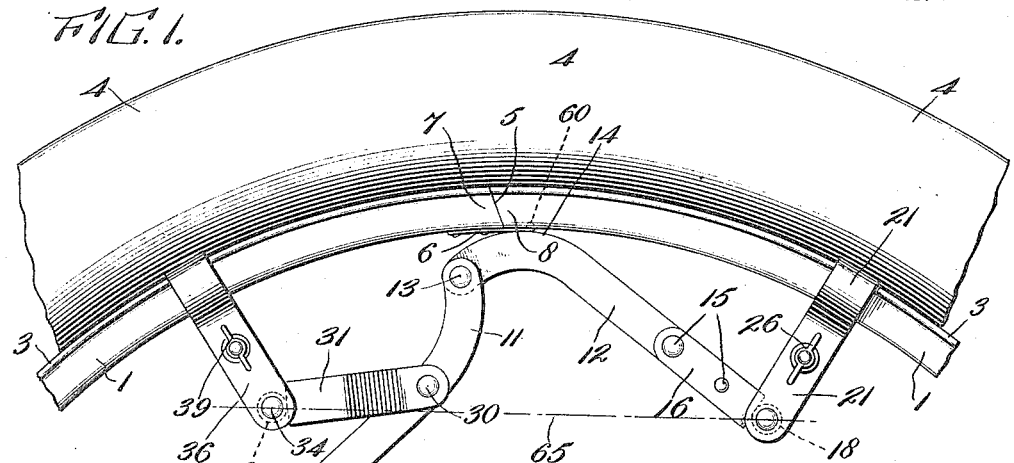
Figure 1 is a side elevational view of a tool made in accordance with the present invention, showing it as applied to a demountable rim for the purpose of contracting it.
Figure 3:
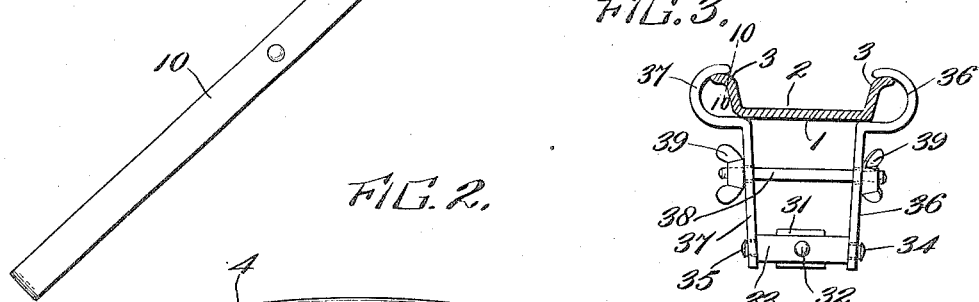
Fig. 3 is an end elevational view of the parts as seen from the left in Fig. 2.

1 designates a vehicle wheel rim, of the type commonly known as demountable, provided with the usual channel 2 and flanges 3, while 4 is any suitable pneumatic or cushion tire adapted to fit in said channel 2, between the flanges 3. The rim 1 is split or broken as at 5 and is provided with any suitable locking means, such as 6 for maintaining the ends 7 and 8 in normal engagement when the rim is in use.

The tool for contracting and expanding this rim comprises a handle or lever 10, preferably stamped from suitable sheet material and bent or folded upon itself, as illustrated. One end of said lever or handle 10 is preferably curved, as at 11, and said curved end is further bifurcated or separated to straddle one end of a curved link member 12, to which it is pivoted, as at 13. The said link member 12 is preferably curved as at 14, at its pivoted end, while its other end is rigidly connected, as at 15, to a yoke member 16. Swiveled to said yoke member 16, see Fig. 8, as by the pin or bolt 17, is a rod or stud 18 provided with the reduced end portions 19 and 20. Mounted on the said reduced portions 19 and 20 are a pair of clamping jaws 21 and 22 respectively. The perforations or openings 23 and 24 in said jaws are of a somewhat greater diameter than the reduced portions 19 and 20 so that the said jaws 21 and 22 are permitted sufficient freedom of movement to enable them to slip over and firmly grip the flanges 3 of the rim 1. The gripping action is controlled by a bolt 25 passing through said jaws and provided with wing nuts 26.

Pivoted to the handle or lever 10, as at 30 is a yoke member 31, similar in construction to the member 16. Swiveled to said yoke member 31, as by a pin 32, is a short shaft 33, having reduced end portions 34 and 35. Loosely fitting said end portions 34 and 35 are a pair of clamping jaws 36 and 37, similar to the jaws 21 and 22, that are controlled by the bolt 38 and wing nuts 39, see Figs. 3, 4, 5 and 9.

Figure 2:
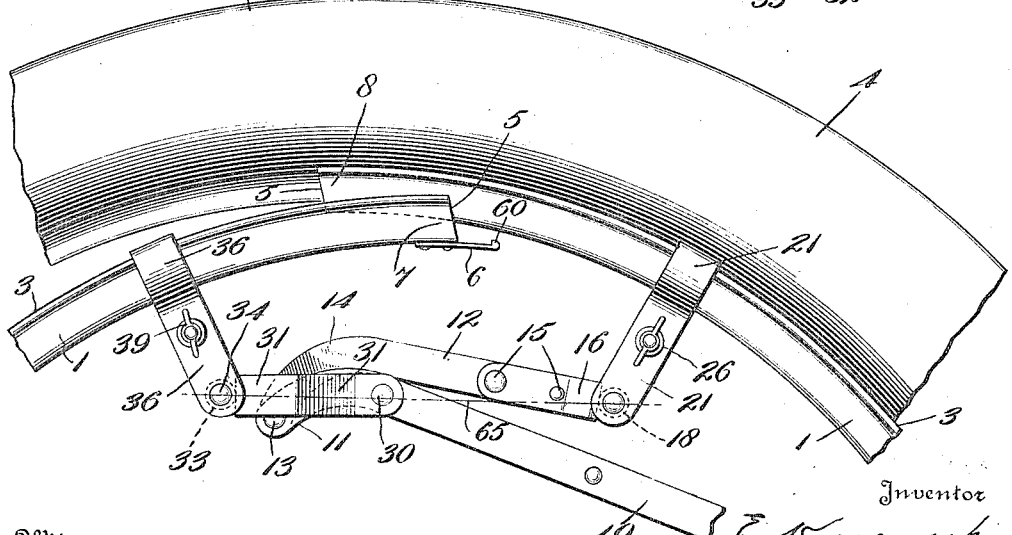
Fig. 2 is a view similar to Fig. 1 but showing the positions assumed by the parts after the contraction of the rim.

The operation of the tool in contracting a rim such as that shown in Figs. 1 and 2 is as follows:—

The said rim and tire 4 being first demounted from the wheel in the usual manner, the clamp jaws 21, 22, 36, and 37 are placed a suitable distance on each side of the break or split 5, and secured to said rim by tightening up the wing nuts 26 and 39 on the bolts 25 and 38 respectively. The parts are now brought in the position shown in Fig. 1, and the locking means 6 is unlocked in any suitable way, as by the insertion of a screw driver or other implement between the said means 6 and the end 8 of the rim 1, so as to disengage the toe 60 of said locking means from the recess 61 in the said end 8. The lever or handle 10 is then swung to the right, as seen in said Fig. 1, until the parts assume the positions illustrated in Fig. 2.

In moving from the position shown in Fig. 1 to that shown in Fig. 2, a pull toward the right in Fig. 1 is brought on the pivot 30, and a pull toward the left on pivot 13, which pulls being resisted by the clamps, a continued movement of the lever 10 toward the right first forces down the pivot 13, and thus the clamping members 36 and 38, causing the end 7 of the rim to disengage and to be forced past the end 8 against the natural resiliency of said rim 1. A still further movement of said lever 10 causes the said pivot 13 to pass below the line 65 joining the pivots 33 and 18, while the pivot 30 remains on or above said line as illustrated, and it therefore results that the powerful pull exerted by the natural resiliency of the rim in its effort to regain the position shown in Fig. 1, only serves to lock the toggle. The rim is now contracted sufficiently to permit the tire 4 to be readily removed therefrom, and of course will be automatically held in this position as long as the toggle remains locked.

When it is desired to replace the rim in the tire 4 the lever 10 is moved downwardly, or to the left, as seen in Fig. 2, and into the position indicated in dotted lines in Fig. 6 or until the pivot 13 rises above the center line 65, whereupon the toggle becomes unlocked and the rim snaps back in place of its own resiliency.

If the inner diameter of the tire 4 is somewhat less than the diameter of the rim 1, or if the width of the tire is greater than that of the channel 2, so as to prevent the rim from fully assuming by its own resiliency its normal position shown in Fig. 1, the tool may be used to force the rim outwardly within the tire. That is to say, by bringing the clamps 21, 22, 36 and 37 closer together, so that the curved portion 14 of the link 12 is brought into actual contact with the end 7 or locking means 6, movement of the lever 10 toward the left, as seen in Fig. 2, will cause said link 12 to fulcrum on said point of contact and separate the ends 7 and 8 of the rim 1, so as to force them outwardly and cause them to snap into position, against the resistance of the tire 4. This forcing action is due to the fact that the parts are so proportioned that when the link 12 contacts with the rim 1, the pivot 30 of the toggle is located above the line 65 passing through the pivots 18 and 33, and therefore a movement of the handle toward the right as seen in Fig. 1, causes the said link 12 to exert a powerful outward pressure on the rim 1.

In certain types of rims the break 5, instead of extending at right angles across the rim, runs diagonally across it, as shown in Figs. 5 and 7. In such cases it is customary to displace the end 7 laterally, as well as to contract it toward the center of the rim, as shown in said Fig. 7. Such lateral displacement may be accomplished with this tool due to the fact that the lever 10 and its co-acting parts may be swung upon the swiveling pivots 17 and 32 to occupy a position substantially parallel to the axis of the rim as will be clear from the drawings. In such position the above described locking features of the toggle still obtain. And if it is desired to contract the rim, such object may be obtained at the same time the ends 7 and 8 are displaced, by causing the handle 10 to occupy a plane at an angle to the rim axis instead of a plane parallel to the same. In this last named position one component of the energy applied to the lever 10 will laterally displace the ends 7 and 8 while another component will contract the rim or cause said ends 7 and 8 to overlap as was explained in connection with Fig. 2.

The clamping jaws 21, 22, 36 and 37 may be straight or flat, as shown in Figs. 1 to 9, but I prefer to curve them slightly as shown at 370 in Fig. 10. When so constructed, the edges or corners 371 and 372 more firmly grip the rim 1, and thus obviate the necessity of providing the various devices such as pins and recesses, heretofore found necessary for preventing the said jaws from slipping.

It is obvious that those skilled in the art may vary the details of construction as well as the arrangement of parts without departing from the spirit of the invention and therefore I do not wish to be limited to the above disclosure except as may be required by the claims.

What I claim is:—

1. In a rim contractor the combination of a pair of gripping members adapted to be secured to each end of a demountable rim; a link member pivoted at one end to each gripping member; and a lever pivoted at one end to the other end of one of said link members, and at a predetermined distance from its end also pivoted to the other end of said other link member, one of said link members also provided with a curved portion constituting a fulcrum adapted to contact with the interior surface of said rim to aid in forcing the ends of said rim in opposite directions, whereby a toggle is formed adapted to expand or contract and to displace the ends of said rim and to become automatically locked when such contraction has been accomplished, substantially as described.

2. In a rim contractor the combination of a pair of gripping members adapted to be secured to the ends of a split rim; and a toggle mechanism comprising links swiveled as well as pivoted to said gripping members adapted to contract said ends, to become automatically locked to hold said contracted ends against the natural resiliency of said rim, and one of said links further provided with a curved portion adapted to facilitate the locking of the toggle, substantially as described.

3. In a rim contractor the combination of a pair of gripping members adapted to be secured to the ends of a split rim; and a toggle mechanism swiveled as well as pivoted to said gripping members, adapted to contract said ends, to become automatically locked and to hold said contracted ends against the natural resiliency of said rim, substantially as described.

4. In a rim contractor the combination of a pair of gripping members adapted to be secured to the ends of a split rim; and a toggle mechanism comprising a curved member adapted to fulcrum against the interior surface of said rim, said toggle mechanism swiveled as well as being pivoted to said gripping members, and adapted to contract and expand said ends, to become automatically locked, and to hold said contracted ends against the natural resiliency of said rim, substantially as described.

5. In a rim contractor the combination of a pair of gripping members adapted to be secured to the ends of a split rim; and a toggle mechanism provided with a curved member adapted on one side to contact with the interior surface of said rim and on its other side to facilitate the locking action of said toggle; said mechanism being pivoted and swiveled to said gripping members, and adapted to move in opposite directions to contract said ends, to become automatically locked, and to hold said contracted ends against the natural resiliency of said rim, substantially as described.

6. In a rim contractor the combination of a pair of gripping members; means to tighten said members on the ends of a split rim; a pivoting and swiveling stud carried by each member; a link swiveled in and pivoted by each stud; and a hand operated lever pivoted to each link to form a toggle capable of laterally displacing and contracting said rim ends, and of becoming automatically locked to hold said ends in their contracted positions, substantially as described.

7. In a rim contractor the combination of a pair of gripping members; means to tighten said members on the ends of a split rim; a pivoting and swiveling stud carried by each member; a link swiveled in and pivoted to each stud; a hand operated lever provided with a curved portion, said lever pivoted to each link to form a toggle capable of laterally displacing and contracting said rim ends, and of becoming automatically locked to hold said ends in their contracted positions and one of said links provided with a curved portion adapted to fulcrum against the interior of said rim to aid in forcing said ends apart, substantially as described.

In testimony whereof I affix my signature, in presence of two witnesses.

EDWARD KNAUSS.

Witnesses:
H. C. STINNER,
M. MAWN.